United States Patent
Zoso et al.

(10) Patent No.: US 7,653,448 B2
(45) Date of Patent: *Jan. 26, 2010

(54) NICAM PROCESSING METHOD

(75) Inventors: Luciano Zoso, Chandler, AZ (US);
Allan P. Chin, Phoenix, AZ (US); David P. Lester, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 645 days.

This patent is subject to a terminal disclaimer.

(21) Appl. No.: 11/240,314

(22) Filed: Sep. 30, 2005

(65) Prior Publication Data

US 2007/0076120 A1    Apr. 5, 2007

(51) Int. Cl.
*G06F 17/00*    (2006.01)
*G06F 12/06*    (2006.01)
*H04H 20/47*    (2008.01)
*H04H 20/88*    (2008.01)

(52) U.S. Cl. .................. 700/94; 711/5; 381/2
(58) Field of Classification Search ............. 700/94; 369/86, 88; 381/2; 711/5, 127, 157, 202, 711/209, 211, 217

See application file for complete search history.

(56) References Cited

U.S. PATENT DOCUMENTS

| | | | |
|---|---|---|---|
| 4,811,394 A * | 3/1989 | Ragavan et al. | 380/261 |
| 5,043,827 A | 8/1991 | Beikirich | |
| 5,243,650 A * | 9/1993 | Roth et al. | 380/237 |
| 5,426,699 A * | 6/1995 | Wunderlich et al. | 380/211 |
| 5,553,263 A * | 9/1996 | Kalish et al. | 711/127 |
| 5,592,517 A | 1/1997 | Camp et al. | |

(Continued)

FOREIGN PATENT DOCUMENTS

GB    2 125 255 A    2/1984

OTHER PUBLICATIONS

Hosgood BSc Ph.D, Steve, "All You Ever Wanted to Know About NICAM but were Afraid to Ask", Apr. 4, 2003, The Wayback Machine, pp. 1-12, http://web.archive.org/web/20030404145148/http://tallyho.bc.nu/~steve/nicam.html.*

(Continued)

*Primary Examiner*—Curtis Kuntz
*Assistant Examiner*—Daniel R Sellers
(74) *Attorney, Agent, or Firm*—Michael J. Balconi-Lamica

(57) ABSTRACT

A NICAM processing method includes receiving and temporarily storing a current frame of A-channel and B-channel input data into a first memory at a first clock rate. Companded A-channel and B-channel data of a previous frame are read from a second memory at a second clock rate and in a manner for interleaving the previous frame companded A-channel and B-channel data into the NICAM standard required interleaved format, wherein the companded A-channel and B-channel data of the previous frame was temporarily stored during a previous frame into the second memory in a format other than an interleaved format according to NICAM standard requirements. The A-channel and B-channel input data of the current frame is companded and stored into the second memory and in the format other than the interleaved format, wherein the companding and storing are performed at a third clock rate during an interval within the current frame that occurs subsequent to both the storing into the first memory and the reading from the second memory.

19 Claims, 8 Drawing Sheets

U.S. PATENT DOCUMENTS

| | | | |
|---|---|---|---|
| 6,150,837 A * | 11/2000 | Beal et al. ..................... 326/39 |
| 6,219,756 B1 * | 4/2001 | Kasamizugami ............ 711/127 |
| 6,498,823 B1 | 12/2002 | Samueli et al. |
| 6,825,690 B1 | 11/2004 | Kundu |
| 6,993,669 B2 * | 1/2006 | Sherburne, Jr. ............. 713/322 |
| 7,030,649 B1 * | 4/2006 | Balasubramanian et al. .. 326/38 |
| 2002/0184546 A1 | 12/2002 | Sherburne, Jr. |

OTHER PUBLICATIONS

EN 300 163 European Standard; Television Systems; NICAM 728: transmission of two-channel digital sound with terrestrial television systems B, G, H, I, K1 and L; Mar. 3, 1998; ;pp. 1-24; V1.2.1; European Telecommunications Standards Institute; France.

Crochiere, Ronald E.; "Interpolation and Decimation of Digital Signals—A Tutorial Review"; Mar. 1991; pp. 300-331; Proceedings of the IEEE; vol. 69, No. 3, IEEE.

Hogenauer, Eugene B., "An Economical Class of DIgital FIlters for Decimation and Interpolation";IEEE Transactions on Acoustics, Speech, and SIgnal Processing; Apr. 1981; pp. 155-162; vol. ASSP-29, No. 3; IEEE.

Samadi, Saed et al.; "Complete Characterization of Systems for Simultaneous Lagrangian Upsampling and Fractional-Sample Delaying"; IEEE Transactions on Circuits and Systems—I:Regular Papers; Mar. 2006; pp. 656-667; vol. 52, No. 3; IEEE.

PCT/US2006/016263 International Preliminary Report on Patentability mailed Nov. 8, 2007 on PCT application corresponding to related U.S. Appl. No. 11/118,211.

PCT/US2006/016263 International Search and Written Opinion mailed Sep. 5, 2006 on PCT application corresponding to related U.S. Appl. No. 11/118,211.

PCT/US06/16264 International Search Report and Written Opinion mailed Oct. 12, 2006 on PCT application corresponding to related U.S. Appl. No. 11/394,254.

Office Action mailed Nov. 10, 2008 on related U.S. Appl. No. 11/117,820.

Office Action mailed Dec. 5, 2005 on related U.S. Appl. No. 11/118,211.

Summary of Interview dated Apr. 10, 2005 on related U.S. Appl. No. 11/116,211.

Notice of Allowance mailed May 8, 2006 on related U.S. Appl. No. 11/118,211.

Office Action mailed Sep. 4, 2008 on related U.S. Appl. No. 11/240,315.

PCT/US06/37626 Internaionall Search Report and Written Opinion mailed Jul. 14, 2008 on PCT application corresponding to related U.S. Appl. No. 11/240,315.

PCT/US06/37626 International Preliminary Report on Patentability mailed Sep. 12, 2008 on PCT application corresponding to related U.S. Appl. No. 11/240,315.

Office Action mailed on related U.S. Appl. No. 11/394,254, mailed on Aug. 3, 2006.

Rejection- Chinese patent application. corresponding to related U.S. Appl. No. 11/394,354, mailed on May 22, 2009.

PCT/US06/16264 International Preliminary Report on Patentability mailed Nov. 8, 2007 on PCT application corresponding to related U.S. Appl. No. 11/118,211.

* cited by examiner

FIG. 1 –PRIOR ART–

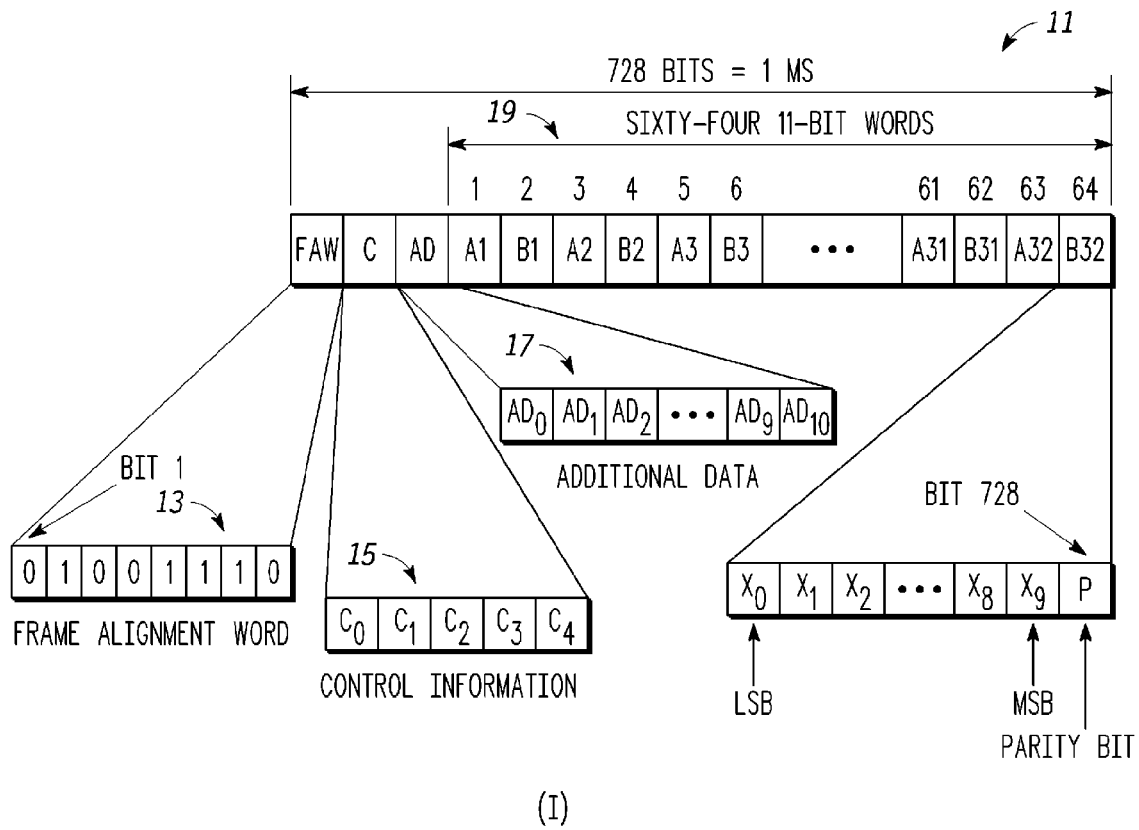
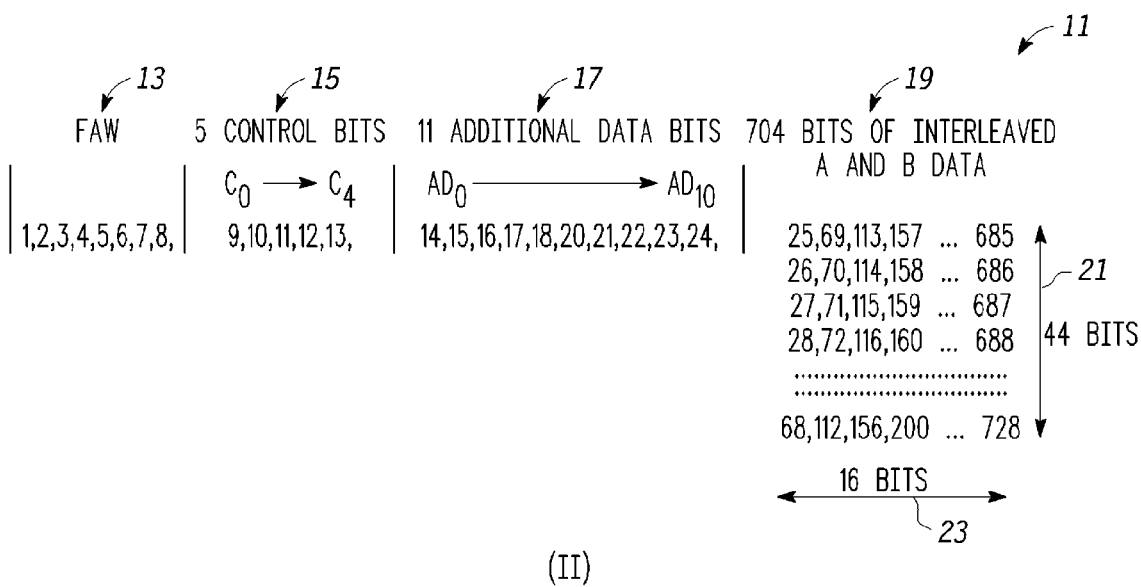
FIG. 2
—PRIOR ART—

NICAM PROCESSING METHOD

CROSS-REFERENCE TO CO-PENDING APPLICATIONS

This application is related to co-pending patent applications, Ser. No. 11/117,820 entitled "FRONT-END METHOD FOR NICAM ENCODING" to Zoso et al. and Ser. No. 11/118,211 entitled "NICAM ENCODER WITH A FRONT END" to Zoso et al., both filed on Apr. 29, 2005, Ser. No. 11/240,315, entitled "NICAM PROCESSOR," filed concurrently herewith, all assigned to the assignee of the present disclosures and incorporated herein by reference.

BACKGROUND

The present disclosures relate to stereophonic audio encoders, and more particularly, to a NICAM processor and method of implementing NICAM processing.

Near-Instantaneously Companded Audio Multiplex (NICAM) encoding improves sound quality and provides multiple channels of digital sound or data compared to other TV sound systems. It is generally used in countries that utilize PAL and SECAM television systems for digital multisound transmission. FIG. 1 is a schematic block diagram view of a prior art composite video and dual channel audio system 10 having an analog filter 12, a dual-channel analog-to-digital converter (ADC) 14, a digital sound NICAM encoder 16, an analog QPSK transmitter 18, and an RF modulator 20. Analog filter 12 filters the two audio inputs 22 and 24, respectively, and outputs the filtered signals on outputs 26 and 28, respectively. The outputs 26 and 28 of analog filter 12 are inputs to the dual-channel ADC 14. ADC 14 receives a first clock at 34 (CLK1), integer multiple of 32 kHz, and converts signals on the ADC inputs 26 and 28 into corresponding digital signals on ADC outputs 30 and 32, respectively. As illustrated, the outputs of the dual channel ADC 14 have 14-bit resolution. Digital sound encoder 16 receives a second clock at 38 (CLK2) and processes signals on encoder inputs 30 and 32 into digitally encoded signals on encoder output 36 according to the NICAM standard. Subsequently, the encoder output 36 is input to analog QPSK transmitter 18. QPSK represents Quadrature Phase Shift Keying. Analog QPSK transmitter 18 receives a third clock at 42 (CLK3) and QPSK modulates the signal received at the input 36 onto the output 40. The QPSK modulated signal on output 40 is then combined with the composite video on signal line 44 by RF modulator 20. The RF modulator then RF modulates the combined QPSK modulated signal and composite video onto RF modulator output 46.

Further in connection with the system of FIG. 1, pre-emphasis can be applied to the two inputs either in the analog or digital domain. The two input signals are digitized to 14 bit resolution at 32 kHz sample rate (CLK1 or an integer divide of CLK1) via ADC 14. The samples are grouped into blocks of thirty-two (32) 14-bit data for the A and B channel, equivalent to a duration of 1 ms. At digital sound encoder 16, the samples of each block are companded to 10 bits with the same scaling factor. One parity bit is then added to each 10-bit sample for error detection and scale-factor signaling purposes. A channel and B channel data are then multiplexed and bits are interleaved according to the interleaving pattern described in the NICAM standard, thus forming a block of 704 bits. Then an 8-bit frame alignment word, 5-bit control information, and 11-bit additional data are added at the beginning of the block of 704 bits, thus forming a frame of 728 bits. Each frame is serially transmitted every millisecond, for example, on signal line 36. The overall bit rate is 728 bit/s, corresponding to clock 38 (CLK2). The bit stream is then scrambled (except for the bits belonging to the frame alignment word), converted into two streams of 1-bit in-phase and quadrature data sampled at 364 kHz (symbol rate), differentially encoded and QPSK modulated, with use of clock 42 (CLK3), onto a 6.552 MHz subcarrier for TV System I or 5.85 MHz for TV System B, G, H and L via QSPK transmitter 18. The QPSK modulated audio signal 40 is then combined with the composite video 44 and RF modulated with RF modulator 20. The RF modulator produces RF signals 46 on VHF and/or UHF channels.

Traditional implementations of NICAM encoding systems are not very cost effective from the view point of integration into an audio/video chip or into a single-chip encoder due to the requirement of multiple clocks and the use of analog blocks which require tuning and which are not easily portable when integrated. Furthermore, traditional implementations of NICAM encoding systems are not very cost effective due to memory requirements and the complexity of the bit interleaving process.

In connection with implementing the NICAM algorithm, memory requirements dictate that the companding process and computation of modified bits can only be performed when all 32 A-channel and B-channel input samples have been acquired. Accordingly, the algorithm requires that 32 samples for each channel A and B must be acquired before performing the NICAM encoding. In addition, a NICAM encoded output stream of 728 bits must be produced continuously without gaps every millisecond. In traditional implementations, extra memory and circuitry are used to meet these requirements. Still further, the interleaving process is complex. The interleaving process according to the NICAM standard is based on a (44×16) matrix structure written by columns, four (4) companded words at a time, and read by rows one bit at a time. In addition, the traditional implementation of a scrambler requires extra processing hardware. As a result, the digital functions of NICAM encoders, in particular, the NICAM algorithm, have been implemented with digital signal processors (DSPs) and Field-Programmable Gate Arrays (FPGAs). Furthermore, pre-emphasis filtering (if not implemented in the analog domain), companding and scale factor encoding are implemented in a DSP, while the NICAM bit interleaving, scrambling and differential encoding are performed by an FPGA. Such DSP and FPGA chips are costly, even when mass produced.

NICAM encoders are generally used in TV stations and typically include very expensive rack mount units. While less costly versions may exist for other applications, the other applications still require a printed circuit board with many discrete components. As a result, in view of cost and complexity, NICAM encoders have been used mainly in broadcast equipment, and not in equipment for use in the home.

Accordingly, there is a need for an improved method for overcoming the problems in the art as discussed above.

BRIEF DESCRIPTION OF THE DRAWINGS

The present invention is illustrated by way of example and not limited by the accompanying figures, in which like references indicate similar elements, and in which:

FIG. 2 is a diagram view of (I) the structure of the components of a 728-bit frame before interleaving and (II) a bit stream of the 728-bit frame bits after interleaving;

Figure 1:
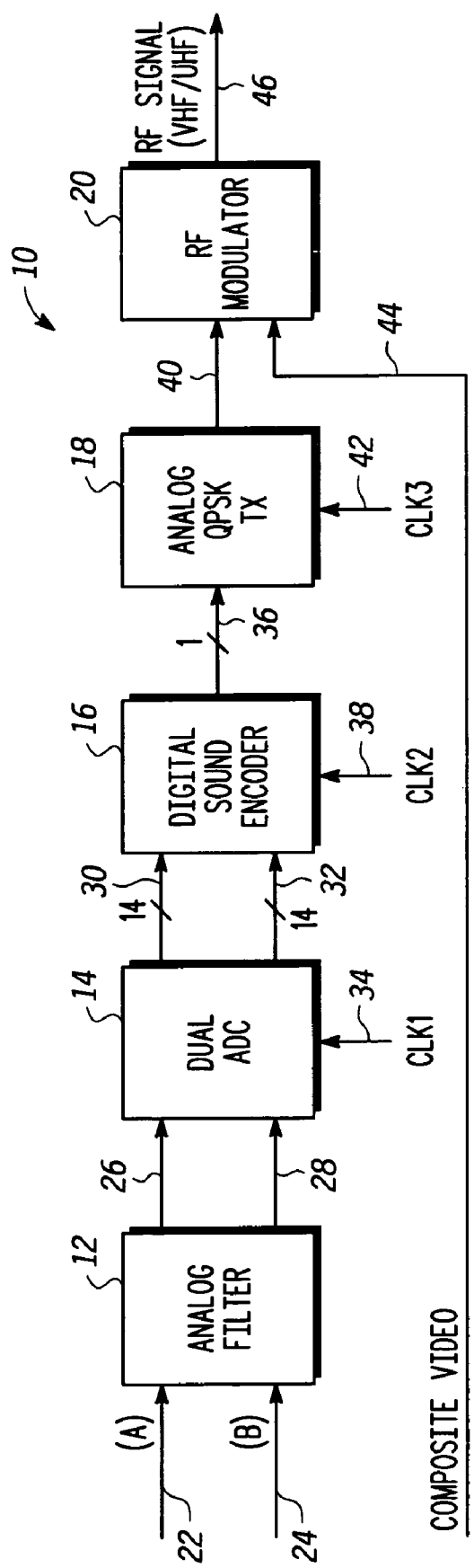
FIG. 1 is a schematic block diagram view of a prior art composite video and dual channel audio system having a NICAM encoder with an analog RF modulator.

The use of the same reference symbols in different drawings indicates similar or identical items. Skilled artisans will also appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

FIG. 2 is a diagram view of (I) the structure of the components of a 728-bit frame before interleaving and (II) a bit stream of the 728-bit frame bits after interleaving. With reference to FIG. 2(I), the components of the bit stream 11 before performing the bit interleaving process include: the 8-bit Frame Alignment Word (FAW) 13, the 5-bit control information 15, the 11-bit additional data 17, and the (64) sixty-four 11-bit A and B processed words, generally indicated by reference numeral 19. The 728-bit frame 11 also shows the relationship between bits and words and bit numbering. That is, bit 1 is the first bit of the FAW 13 and bit 728 is the last bit of word B32.

Further with the overall frame structure of FIG. 2(I), the 8-bit FAW 13, the five (5) control bits 15 and the eleven (11) additional data bits 17 are added to the payload 19, thus forming a frame of 728 bits, indicated by reference number 11. As illustrated, the FAW 13 is 01001110 and the left-most bit (i.e., BIT 1) is transmitted first. With respect to the control information 15, it consists of a frame flag bit Co, three application control bits ($C_1$, $C_2$ and $C_3$) and a reserve sound switching flag $C_4$. The frame flag bit $C_0$ is set to one (1) for eight (8) successive frames and to zero (0) for the next eight (8) frames, thus defining a sixteen (16) frame sequence. The 16 frame sequence is used to synchronize changes in the type of information being carried in the channel. The application control bits are set according to a desired content of the 704-bit sound/data of the payload 19. With respect to the reserve sound switching flag $C_4$, if the analog signal is not carrying the same program as the digital one, then $C_4$ is set to zero (0), otherwise it is set to one (1). The eleven additional data bits 17 are reserved for future use (yet to be defined) and therefore the eleven additional data bits can be arbitrarily set to zero (0).

FIG. 2(II) shows how the bits of frame 11 are rearranged at a bit level after the bit interleaving process. In particular, interleaving is applied to companded samples of the structure of FIG. 2(I) in order to minimize the effect of multiple-bit errors. The companded samples are rearranged according to a prescribed (44×16) matrix structure, as indicated by reference numeral 19 in FIG. 2(II). As per the NICAM standard, the (44×16) matrix is written column by column, four (4) companded words at a time, and read row by row one bit at a time. The 44 bits of each column of the matrix are indicated by reference numeral 21 and the 16 bits of each row of the matrix are indicated by reference numeral 23. The bits of each frame are transmitted in the order shown in FIG. 2(II). In FIG. 2(II) (i.e., after interleaving), the bit numbering refers to the same numbering as used in FIG. 2(I) (i.e., before interleaving). In addition, the bit stream 11 of FIG. 2(II) is representative of output 36 of the digital sound encoder 16 of FIG. 1. It is noted that prior to performing differential encoding according to the NICAM standard, the bits of the bit stream of FIG. 2(II) need to be grouped in bit pairs (i.e., dibits). In one embodiment, the NICAM processor generates such bit pairs directly.

Figure 3:
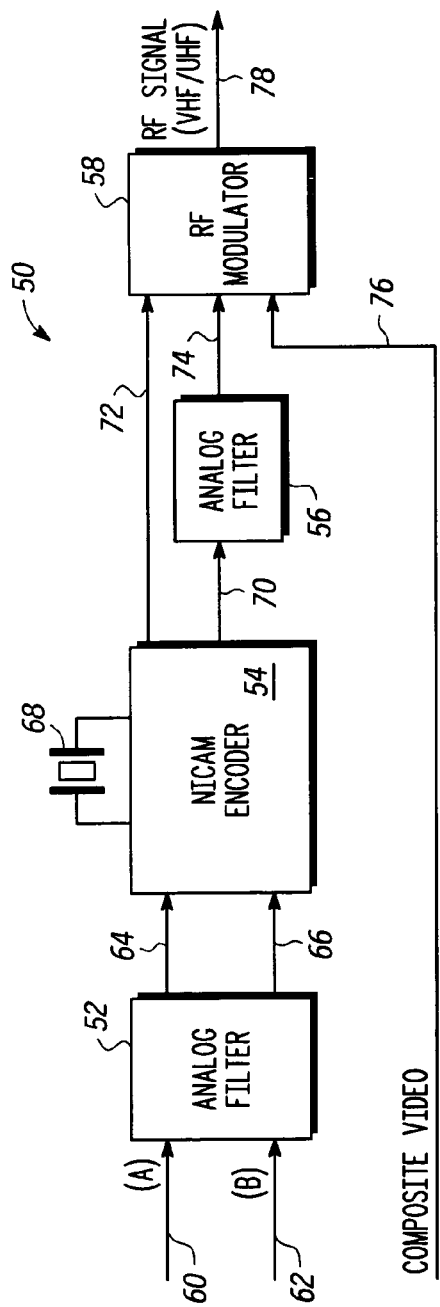
FIG. 3 is a schematic block diagram view of a composite video and dual channel audio system having a single-chip NICAM encoder for implementing a method according to one embodiment of the present disclosure.

FIG. 3 is a schematic block diagram view of a composite video and dual channel system 50 having a NICAM encoder implementation for implementing a method according to one embodiment of the present disclosure. The composite video and dual channel system 50 includes a first analog filter 52, a NICAM encoder 54, a second analog filter 56, and an analog RF modulator 58. Analog filter 52 filters two (2) inputs 60 and 62, respectively, and outputs the filtered signals on outputs 64 and 66, respectively. The dual inputs can comprise independent channels (i.e., (A) and (B)) or the left and right audio channels of a stereo pair. In one embodiment, analog filter 52 comprises an analog anti-aliasing filter.

The outputs 64 and 66 of analog filter 52 are inputs to the NICAM encoder 54. NICAM encoder 54 receives a single clock at 68 (CLK) and converts signals on the inputs 64 and 66 into a corresponding QPSK modulated signal on output 70. In one embodiment, the clock at 68 comprises a crystal oscillator. NICAM encoder 54 also provides a clock output on signal line 72, as discussed further below. As illustrated, the output 70 of NICAM encoder 54 is input to the second analog filter 56. Filter 56 provides a filtered QPSK modulated signal with a carrier of 6.552 or 5.85 MHz on output signal line 74. In one embodiment, filter 56 comprises an analog reconstruction filter. The filtered QPSK modulated signal on output 74 is then combined with the composite video on signal line 76 by RF modulator 58. The RF modulator 58 then RF modulates the combined QPSK modulated signal and composite video onto RF modulator output 78 as an RF signal (VHF/UHF). RF modulator 58 further receives a clock input on signal line 72.

Figure 4:
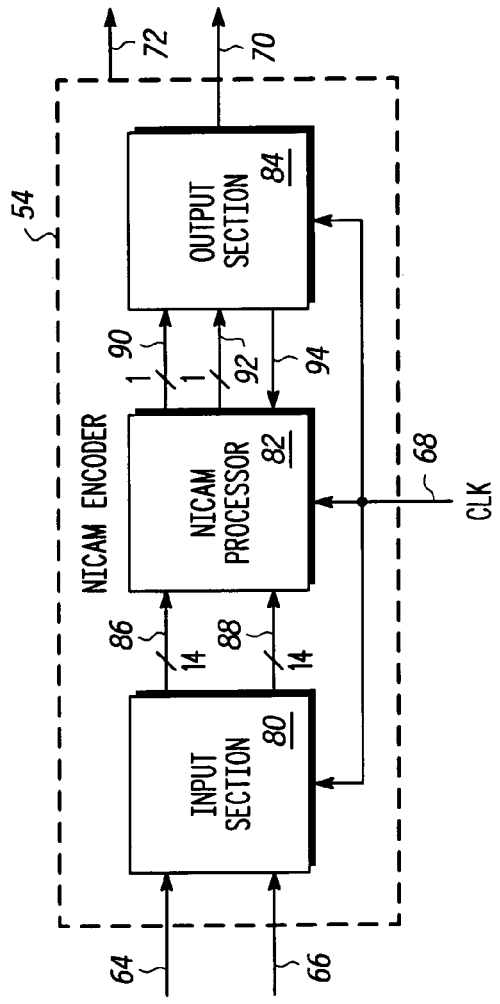
FIG. 4 is a schematic block diagram view of the NICAM encoder implementation of FIG. 3 in greater detail for implementing a method according to one embodiment of the present disclosure.

FIG. 4 is a schematic block diagram view of the NICAM encoder implementation of FIG. 3 in greater detail for implementing a method according to one embodiment of the present disclosure. The NICAM encoder 54 includes a front-end input section 80, a NICAM processor 82, and a front-end output section 84. As discussed above, NICAM encoder 54 includes inputs 64 and 66, receives a single clock at 68 (CLK). In one embodiment, the clock output on signal line 72 is derived from the clock input on signal line 68 (CLK), for example, using suitable integer dividers. NICAM encoder 54 converts signals on the inputs 64 and 66 into a corresponding QPSK modulated signal on output 70. In one embodiment, the front-end of NICAM encoder 54 comprises the front-end input section 80 and the front-end output section 84.

Responsive to data signals on inputs 64 and 66, as well as in response to clock input 68, the front-end input section 80 processes the inputs to produce 14-bit data at 32 kHz according to the NICAM standard, on output lines 86 and 88, respectively. Pre-emphasis is performed in the analog domain or in the front-end input section 80. In one embodiment, pre-emphasis filtering could be performed by the NICAM processor 82, even though the mapping of the analog filter into the digital domain would not be as accurate due to a limitation on the sampling frequency.

In one embodiment, the outputs 86 and 88 of front-end input section 80 correspond to respective inputs to NICAM processor 82. Responsive to the signals on inputs 86 and 88, as well as in response to clock input 68 and a processor strobe on signal line 94, the NICAM processor processes the inputs into in-phase (I) and quadrature (Q) single-bit data stream signals on output lines 90 and 92, respectively. In other words, NICAM processor 82 accepts the samples generated at 32 kHz by the front-end input section 80. NICAM processor 82 then performs digital companding on the inputs 86 and 88, respectively, and produces scrambled and differentially encoded in-phase (I) and quadrature (Q) data, sampled at 364 kHz in compliance with the NICAM standard, on outputs 90 and 92, respectively. In an alternate embodiment, the I and Q data on signal lines 90 and 92 could also be provided on a single signal line (not shown) at 728 kHz, using a suitable circuit implementation.

As indicated herein above, various aspects of NICAM processing according to the NICAM standard are known in the art and only briefly described herein. However, in connection with NICAM processor 82, the embodiments of the present disclosure are more fully described herein below.

With reference still to FIG. 4, the outputs 90 and 92 of the NICAM processor 82 correspond to respective inputs to the front-end output section 84. Responsive to in-phase (I) and quadrature (Q) single-bit data stream signals on inputs 90 and 92 (i.e., bit pairs), as well as in response to clock input 68, the front-end output section 84 processes the inputs into a corresponding QPSK modulated signal on output 70. The QPSK modulated signal on output 70 comprises a signal that meets the NICAM standards. Furthermore, front-end output section 84 generates the processor strobe on signal line 94, discussed herein. In one embodiment, the front-end input section 80 and the front-end output section 84 comprise front-end input and output sections as disclosed in co-pending patent applications Ser. No. 11/117,820 entitled "FRONT-END METHOD FOR NICAM ENCODING" to Zoso et al. and Ser. No. 11/118,211 entitled "NICAM ENCODER WITH A FRONT END" to Zoso et al., both filed on Apr. 29, 2005 and assigned to the assignee of the present application, and incorporated herein by reference. For simplicity of discussion, additional details of the front-end input section 80 and the front-end output section 84 are not provided further herein. In another embodiment, the processor strobe on signal line 94 can be provided by any suitable control logic or circuit implementation.

With reference again to the NICAM processor 82, the processor processes the 14-bit A and B data (on signal lines 86 and 88, respectively) sampled at 32 kHz provided by the input section 80 and produces in-phase and quadrature data (on signal lines 90 and 92, respectively) sampled at 364 kHz in compliance with the NICAM standard. In particular, according to an embodiment of the present disclosure, the NICAM processor 82 performs combinations of: data acquisition, computation of scale factors, companding of 14-bit incoming data to 10-bit resolution, computation of parity bits, encoding of parity bits with scale factors, bit interleaving, generation of a 728-bit bit stream, scrambling of all data of a frame performed in 32 cycles of the system clock, conversion of the bit stream into two streams of 1-bit in-phase and quadrature data, and differential encoding. Processor 82 outputs a bit pair on output signal lines 90 and 92 in response to each occurrence of a strobe on signal line 94 from the front-end output section 84. In one embodiment, the strobe 94 occurs at a frequency on the order of about 364 kHz and can be generated by suitable control logic contained within front-end output section 84 or elsewhere. In one embodiment, the scrambling of the A-channel and B-channel companded data is performed at every occurrence of the strobe 94.

Figure 5:
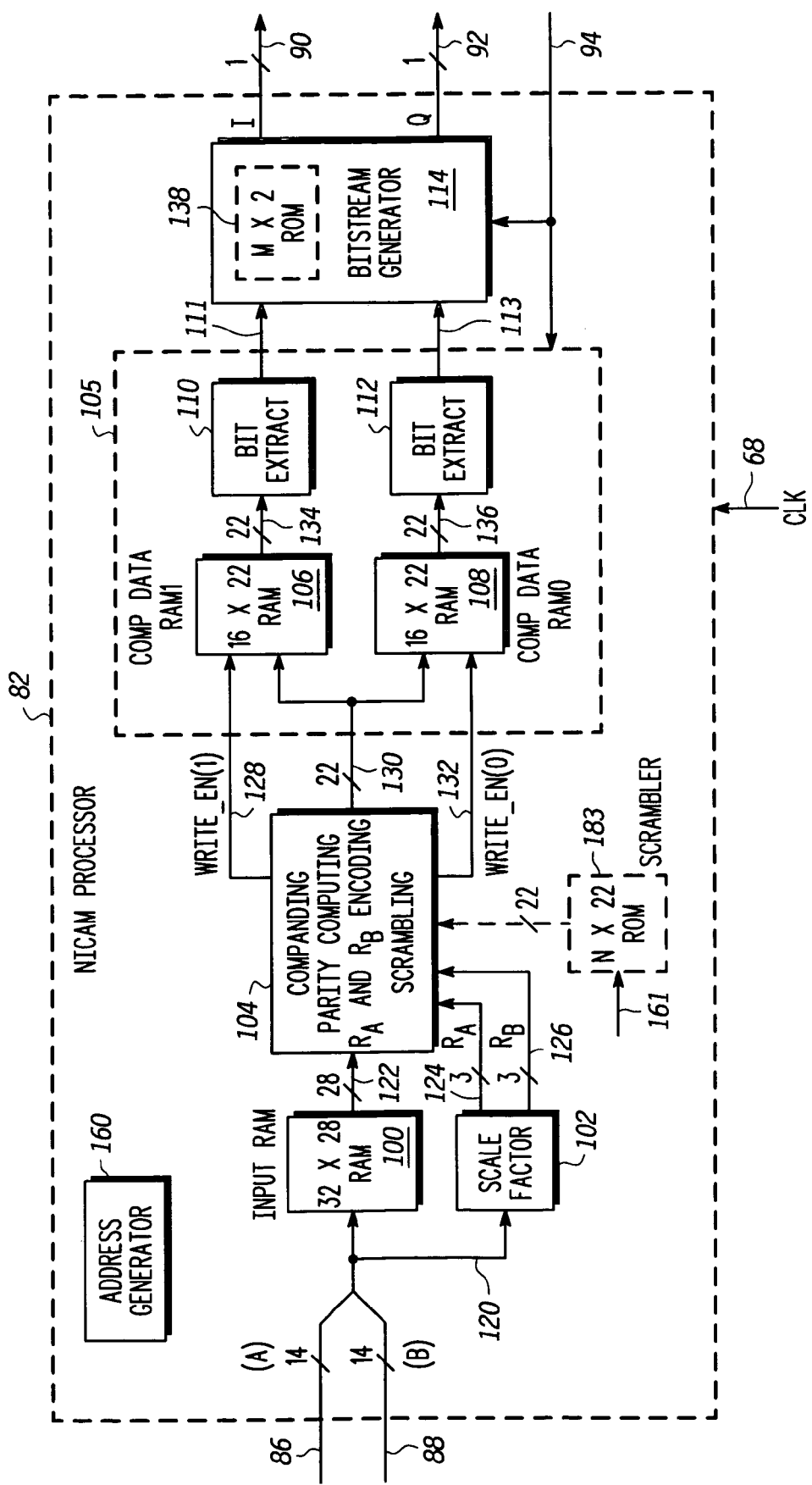
FIG. 5 is a schematic block diagram view of the NICAM processor of FIG. 4 in greater detail for implementing a method according to one embodiment of the present disclosure.

FIG. 5 is a schematic block diagram view of the NICAM processor 82 of FIG. 4 in greater detail for implementing a method according to one embodiment of the present disclosure. Processor 82 comprises several main blocks that include: 1) blocks 100 and 102 for data acquisition and computation of scale factors, respectively, 2) block 104 for companding, parity bit computation, encoding of parity bits with scale factors, and scrambling, 3) block 105 for bit interleaving, and 4) block 114 for bit stream generation.

Figure 8:
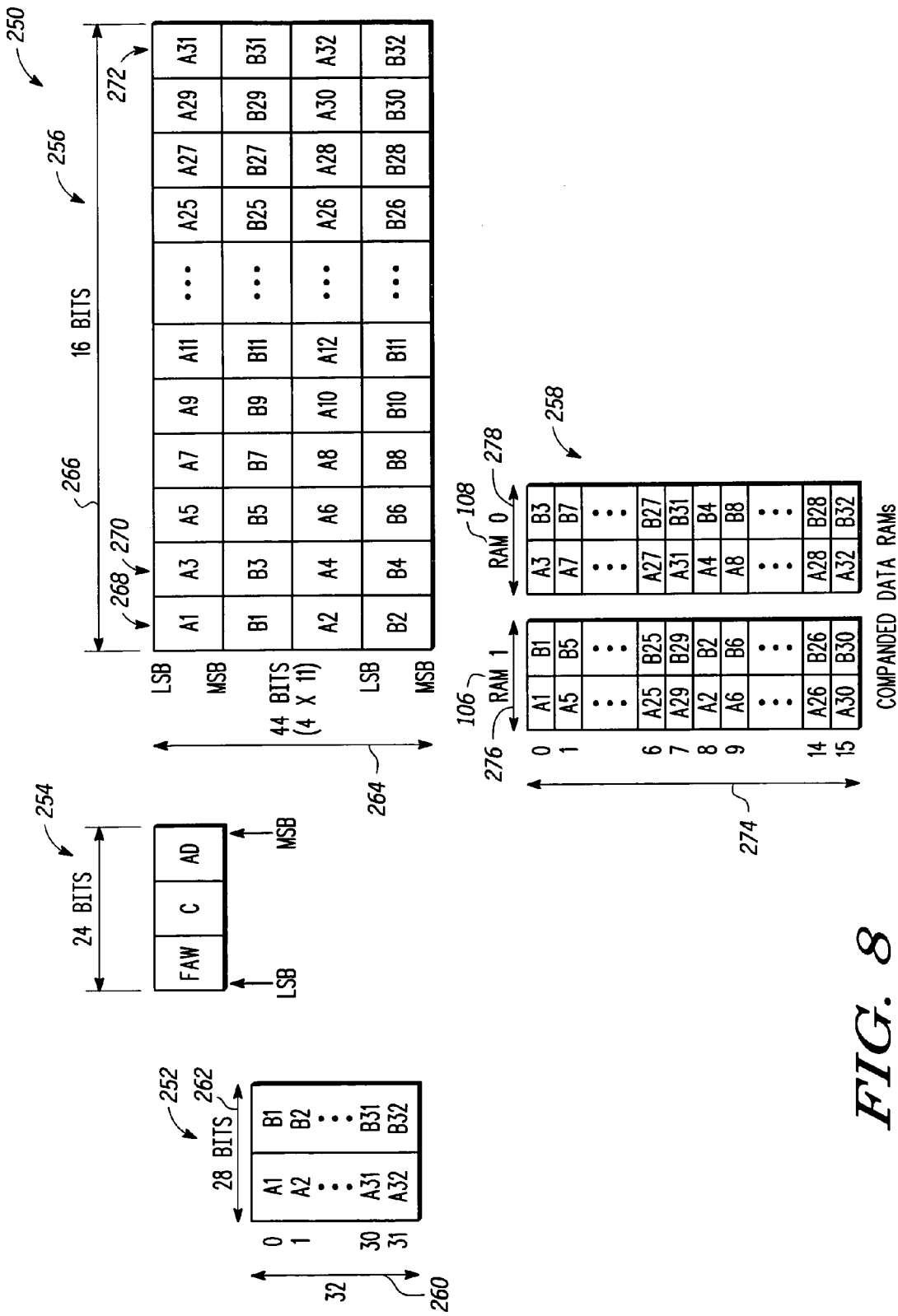
FIG. 8 is a matrix structure view of input RAM contents, an FAW/C/AD partial frame, companded samples after interleaving, and companded data RAMs according to one embodiment of the present disclosure.

More particularly, 14-bit A-channel and B-channel data (sampled at 32 kHz) on input signal lines 86 and 88 are merged into 28-bit words and stored into a 32×28 input RAM 100. The 14-bit A-channel and B-channel data stored in RAM 100 is provided to block 104 via output data bus 122, as discussed herein. In one embodiment, the input RAM data format comprises that as shown in FIG. 8, indicated by reference numeral 252. As shown in FIG. 8, the 32-bit dimension of the RAM data format 252 is indicated by reference numeral 260, and the 28-bit dimension is indicated by reference numeral 262.

In one embodiment, the NICAM processor 82 can also include a pre-emphasis filter (not shown). That is, the A-channel and B-channel data can be filtered by a pre-emphasis filter before being merged into 28-bit words and stored into input RAM 100. Pre-emphasis filtering can be implemented using any suitable circuitry or implementation for performing pre-emphasis filtering according to the requirements of the NICAM standard.

Referring again to FIG. 5, NICAM processor 82 also includes a scale factor block 102. Scale factor block 102 receives data on input 120 and provides an A-channel and a B-channel scale factor output $R_A$ and $R_B$ on signal lines 124 and 126, respectively. In particular, a computation of largest absolute values is performed within scale factor block 102 concurrently with acquisition of data samples. That is, at the beginning of a frame, the absolute values of the first A-channel and B-channel data samples are stored into two registers (not shown) within block 102. The magnitudes of the second A-channel and B-channel samples are compared with the contents of the registers and, if the latter samples are greater, then they replace the register contents. The process is repeated for all the thirty-two (32) A-channel and B-channel input samples. When the last A-channel and B-channel input samples are stored into the RAM 100, the largest values are available in the two registers. Scale factor block 102 then determines scale factors, for example, by comparing the largest values stored in the two registers with a number of thresholds. In one embodiment, the number of thresholds comprises seven (7) thresholds and the A-channel and B-channel scale factors $R_A$ and $R_B$ comprise 3 bits on signal lines 124 and 126, respectively.

Block 104 is responsive to input data on signal lines 122 and the A-channel and B-channel scale factors $R_A$ and $R_B$ on signal lines 124 and 126, respectively, for companding, parity bit computation, and encoding of parity bits with scale factors as discussed further herein below with reference to FIG. 7. Block 104 provides 22 bits of companded data on output signal bus 130, in addition to write enable signals on WRITE_EN(1) and WRITE_EN(0) lines indicated by reference numeral 128 and 132, respectively. In another embodiment, write enable signals can be provided by any suitable control logic or circuit implementation. In one embodiment, scrambling is performed in block 104, however, scrambling can also be performed outside of block 104 (via N×22 ROM 183) but in association with block 104, or in block 114 of FIG. 5 (via M×2 ROM 138), to be discussed further herein. In one embodiment, scrambling is accomplished with the use of a look-up table, wherein the scrambling is re-initialized at the beginning of every frame. A look-up table implementation is more cost effective than a traditional hardware scrambler, such as described in the NICAM standard, because the look-up table requires less processing hardware and the look-up table address is readily available, for example, via an address generator 160. In other words, address generation for the look-up table can be obtained without the specific need for implementing a counter to generate the address. The bit stream generator 114 adds the FAW 13, control information 15 and additional data 17 to the bit stream 11 of the processed A-channel and B-channel data as shown in FIG. 2(II). As discussed herein, NICAM processor 82 operates in a very efficient way and with a limited or minimum amount of memory to implement the NICAM algorithm, thus making the NICAM processor 82 more suitable for a single-chip integration.

In one embodiment, processor 82 includes one 32×28 RAM (100) for the input data and two 16×22 RAMs (106 and 108) within block 105 for the companded data. Block 105 of processor 82 performs a complex interleaving process (i) by storing the companded data with modified parity bits into companded data RAMs 106 and 108 in a particular order and (ii) by reading from the RAMs 106 and 108 a number of times using bit extractors 110 and 112, respectively, extracting two bits (or a bit pair) per RAM access. RAMs 106 and 108 couple to bit extractors 110 and 112 via 22 bit signal buses 134 and 136, respectively. In addition, bit stream generator 114 is responsive to extracted companded interleaved data bits on signal lines 111 and 113 for generating the I and Q data on signal lines 90 and 92, respectively, as discussed further herein in connection with FIG. 9. In another embodiment, bit stream generator 114 can be configured for generating a single bit stream from the extracted companded interleaved data bits, wherein the companded interleaved data bits are extracted from the companded data memory in the form of a single bit stream.

Furthermore, address generator 160 of FIG. 5 comprises any suitable address generator. Moreover, address generator 160 is configured to provide addresses to the various components of the NICAM processor 82, as appropriate, for carrying out the method of NICAM encoding and the NICAM encoder embodiments of the present disclosure.

Figure 6:
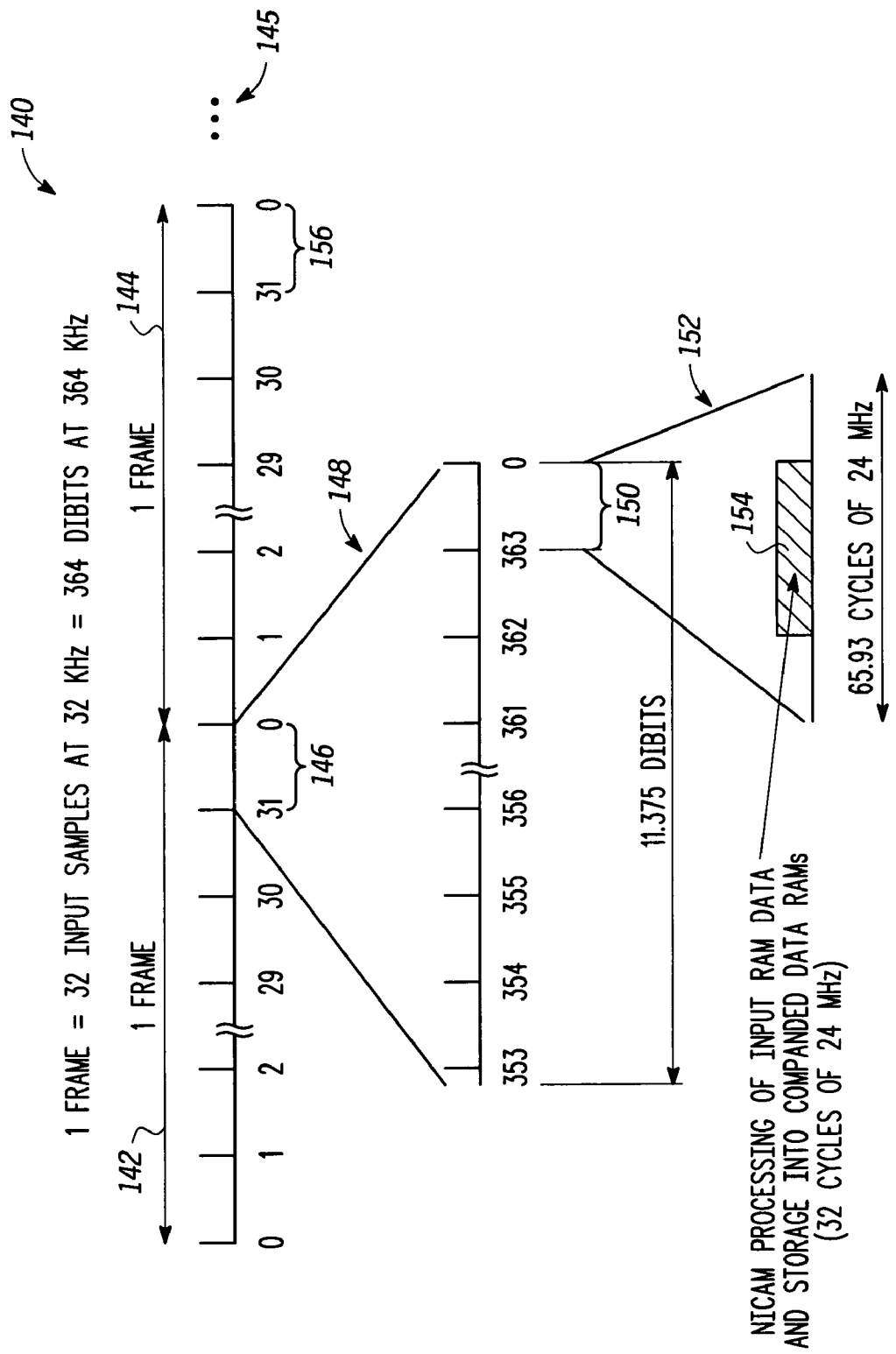
FIG. 6 is a timing representation view of a timing relationship between input samples and bit pairs during a data companding portion of NICAM encoder implementation processing according to one embodiment of the present disclosure.

FIG. 6 illustrates a timing relationship between input samples and bit pairs (also referred to herein as "dibits"), in addition to timing for the processing of the input memory data to produce companded samples, as discussed further herein. In the timing representation 140 and with respect to the input sample timing, there are thirty-two (32) samples per frame on each of the A-channel input and the B-channel input. Timing representation 140 includes frames 142, 144, and additional frames (as indicated by the ". . . " pointed to by reference numeral 145). It is noted that one frame is equal to 32 input samples at 32 kHz, which is equivalent to 364 dibits output at 364 kHz. Interval 146 represents an interval between the last acquired input sample data of frame 142 and a first acquired input sample data of the next frame 144. In an expanded view 148 of the interval 146 of sample 31, there is contained approximately 11.375 dibits. Further in the expanded view 148, note that the output dibit 353 is not exactly aligned with the beginning of sample 31. In other words, any given output dibit within a frame may occur at a timing that is different from a timing of an input sample, i.e., the output dibit may not exactly coincide with the occurrence of an input sample. In addition, interval 150 represents an interval between the last output dibit during frame 142 and a first output dibit of the next frame 144. In an expanded view 152 of the interval 150 of dibit 363, there is contained a sub-interval 154 in which NICAM processing of input RAM data (i.e., sampled A-channel and B-channel input data in RAM 100) and storage into companded data RAMs (106 and 108) can be accomplished. Sub-interval 154 can comprise any portion or portions of the entire interval 150, excluding the extremities of interval 150. In one embodiment, the top level system clock comprises a 24 MHz clock and interval 150 comprises approximately 65.93 cycles of the 24 MHz clock. Furthermore, in the case of the 24 MHz clock, interval 154 would include 32 cycles of the 24 MHz clock, assuming that the two channels of data are processed in parallel. The above is repeated in the next frame 144 within interval 156, and so on for subsequent frames. Interval 156 represents an interval between the last acquired input sample data of frame 144 and a first acquired input sample data of a next frame (not shown).

While the processor 82 is acquiring data, it must also continuously output bit pairs at the rate of 364 kHz, i.e., without gaps. The portion of the timing diagram 140 indicated by reference numeral 148 shows the timing of bit pairs for the very last part of the frame 142. In addition, according to the embodiments of the present disclosure, NICAM processing of the acquired data is performed during time interval 150. The interval 150 is very important in that (i) all the input data of the current frame have been acquired and (ii) at the same time, all the companded data stored in the companded data memory (106 and 108) from a previous frame have been output. This means that the acquired data (i.e., input A-channel and B-channel data) of the current frame can be processed (in compliance with the NICAM standard) and the results can be stored directly into the companded data memory (RAMs 106 and 108). As a result, no additional memory is required. The processor 82 must also be fast enough to process all the input data after the last bit pair has been output from the companded data memory and before a new input sample is acquired.

Figure 7:
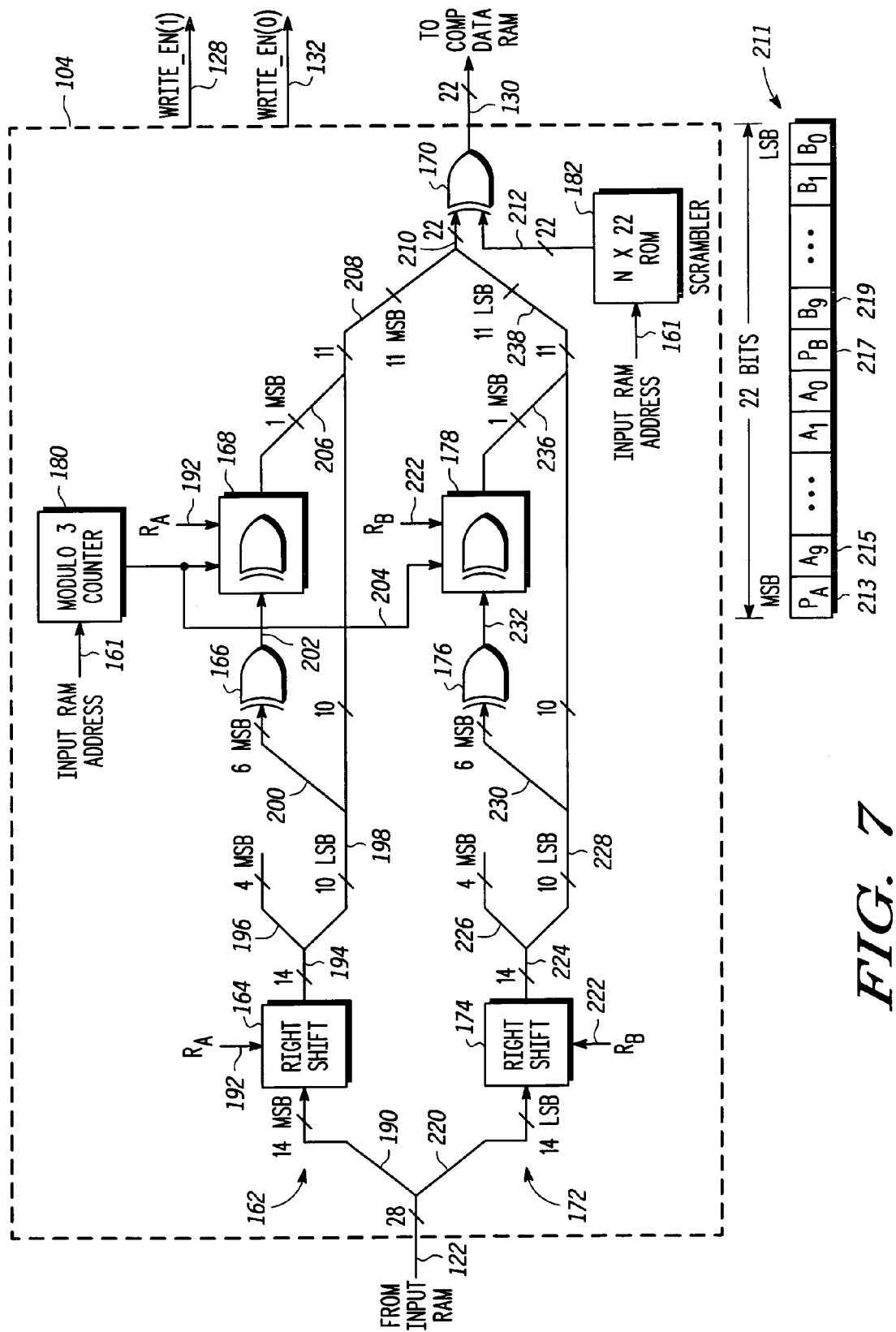
FIG. 7 is a schematic block diagram view of a companding, parity computing, parity bit encoding with scale factors, and scrambling block of the NICAM processor of FIG. 4 in greater detail for implementing a method according to one embodiment of the present disclosure.

In one embodiment, the companding of each A-channel and B-channel sample, along with the computation of parity bits and the encoding of parity bits with the scale factors, is performed by the circuit implementation shown in FIG. 7. The format of the companded samples is also illustrated, as indicated by reference numeral 211. In particular, the format 211 comprises 22-bits and is illustrated from MSB to LSB, where modified parity bit $P_A$ (indicated by reference numeral 213) is followed by sign bit $A_9$ (indicated by reference numeral 215), which is followed by the remainder of the companded A data, corresponding to $A_8$-$A_0$. Following $A_0$ is modified parity bit $P_B$ (indicated by reference numeral 217), which is followed by sign bit $B_9$ (designated by reference numeral 219). Following sign bit $B_9$ is the remainder of the companded B data, corresponding to $B_8$-$B_0$. Modified parity bit $P_A$ represents the MSB, while B data bit $B_0$ represents the LSB of format 211 of the companded samples. Each sample is read from the input RAM, processed and written into the companded data RAMs, using the format 211 as illustrated or another suitable format, in one cycle of the system clock. According to one embodiment of the present disclosure, it takes 32 cycles of system clock during the interval 150 at the end of each frame to process the entire input RAM 100. As discussed herein above, FIG. 6 shows the timing relationship between input samples and dibits, as well as when the input RAM data are processed to produce the companded samples.

In one embodiment, block 104 of FIG. 7 comprises a means for (i) companding, (ii) performing parity bit computation, (iii) encoding of parity bits with scale factors, and (iv) scrambling. The selection of desired bits of the scale factors ($R_A$, $R_B$), in which each scale factor has three (3) bits, is as described in the NICAM standard. In one embodiment, the scale factor bit selection is performed by the Modulo-3 counter 180. Alternatively, the scale factor function can be implemented in other ways, for example, with a suitable look-up table. In addition, the scale factor bit is EX-ORed with a parity bit as described in the NICAM standard. In one embodiment, the selected bit of the scale factors ($R_A$, $R_B$) is EX-ORed with the parity bit via EX-OR gates in multifunction blocks 168 and 178, respectively, as discussed further herein.

In one embodiment, block 104 of FIG. 7 comprises an A-channel processing portion, generally indicated by reference numeral 162, and a B-channel processing portion, generally indicated by reference numeral 172. The A-channel processing portion 162 includes a right shifter 164, EX-OR tree 166, multifunction block 168, and EX-OR gate block 170, wherein EX-OR gate block 170 is shared with the B-channel processing portion 172. From the input RAM 100 on signal bus 122, the 14 MSBs are routed to the right shifter via signal bus 190. Right shifter 164 operates in response to the 14 MSBs on signal bus 190 and a scale factor $R_A$ on signal line 192 for providing a shifted output on signal bus 194. The four MSBs of the shifted output are discarded on signal bus 196 and the 10 LSBs of the shifted output are forwarded on signal bus 198. The 6 MSBs of the 10 LSBs on signal bus 198 are routed via signal bus 200 to EX-OR tree 166. EX-OR tree 166 operates in response to the 6 MSBs on signal bus 200 for providing an output on line 202. That is, EX-OR tree 166 performs the EX-OR of all six (6) inputs and produces a single bit output. The signal on line 202 is an input to multifunction block 168. Multifunction block 168 operates in response to the signal on line 202, the output 204 of Modulo 3 counter 180, and scale factor $R_A$ on signal line 192, for providing a MSB on output signal bus 206. In other words, multifunction block 168 selects a bit of the scale factor $R_A$ 192 based on the control signal 204 produced by Modulo 3 counter 180 in accordance with Equation 1 and Table 1, as discussed further herein. Furthermore, multifunction block 168 EX-ORs the selected bit of $R_A$ with the output of EX-OR tree 166, thus producing the modified parity bit $P_A$ 213 of format 211 which is output on line 206. The MSB on bus 206 is combined with the 10 LSBs on bus 198 to produce 11 MSBs of a corresponding companded sample on signal bus 208. The 11 MSBs on bus 208 are combined with the 11 LSBs (to be discussed) of the corresponding companded sample on bus 238 to produce 22 bits of the companded sample on signal bus 210 and input to EX-OR gate block 170. In one embodiment, EX-OR gate block 170 includes 22 EX-OR gates, each gate for performing an EX-OR of a bit of signal 210 with a corresponding bit of signal 212, thus producing a 22-bit output on line 130.

The B-channel processing portion 172 includes a right shifter 174, EX-OR tree 176, multifunction block 178, and EX-OR gate block 170 which is shared with the A-channel processing portion 162. From the input RAM 100 on signal bus 122, the 14 LSBs are routed to the right shifter via signal bus 220. Right shifter 174 operates in response to the 14 LSBs on signal bus 220 and a scale factor bit $R_B$ on signal line 222 for providing a shifted output on signal bus 224. The four MSBs of the shifted output are discarded on signal bus 226 and the 10 LSBs of the shifted output are forwarded on signal bus 228. The 6 MSBs of the 10 LSBs on signal bus 228 are routed via signal bus 230 to EX-OR tree 176. EX-OR tree 176 operates in response to the 6 MSBs on signal bus 230 for providing an output on line 232. That is, EX-OR tree 176 performs the EX-OR of all six (6) inputs and produces a single bit output. The signal on line 232 is an input to multifunction block 178. Multifunction block 178 operates in response to the signal on line 232, the output 204 of Modulo 3 counter 180, and scale factor RB on signal line 222, for providing a MSB on output signal bus 236. In other words, multifunction block 178 selects a bit of the scale factor $R_B$ 222 based on the control signal 204 produced by Modulo 3 counter 180 in accordance with Equation 1 and Table 1, as discussed further herein. Furthermore, multifunction block 178 EX-ORs the selected bit of $R_B$ with the output of EX-OR tree 176, thus producing the modified parity bit $P_B$ 217 of format 211 which is output on line 236. The MSB on bus 236 is combined with the 10 LSBs on bus 228 to produce 11 LSBs of the corresponding companded sample on signal bus 238. The 11 LSBs on bus 238 are combined with the 11 MSBs (previously discussed) of the corresponding companded sample on bus 208 to produce 22 bits of the companded sample on signal bus 210 and input to EX-OR gate block 170. As discussed herein, in one embodiment, EX-OR gate block 170 includes 22 EX-OR gates, each gate for performing an EX-OR of a bit of signal 210 with a corresponding bit of signal 212, thus producing a 22-bit output on line 130.

It is noted that in FIG. 7, block 104 has been shown and described to include separate and distinct processing portions 162 and 172 for handling channel A data and channel B data, respectively. However, in another embodiment, block 104 of FIG. 7 can comprise a single processing unit (either 162 or 172) which is multiplexed between the two channels, thus further reducing an overall hardware complexity of the NICAM processor 82.

In one embodiment, scrambling is provided by scrambler 182 (FIG. 7) in the form of an N×22 ROM, where N in this instance equals 32. Scrambler 182 is responsive to an input RAM address on address input line 161 for providing a twenty-two (22) bit scrambling output on bus 212. The address on address line 161 can be provided by address generator 160 (FIG. 5), as appropriate. EX-OR gate 170 is responsive to the bits on bus 210 and 212 for providing twenty-two (22) bits of scrambled companded data on output signal bus 130. Signal bus 130 is input to the companded data RAMs (106 and 108) of FIG. 5, as discussed herein. Block 104 further provides suitable write-enable signals WRITE_EN(1) 128 and WRITE_EN(0) 132, respectively (in FIGS. 5 and 7) to companded data RAM(1) 106 and RAM(0) 108 (in FIGS. 5 and 8) which, along with an address provided by the address generator 160 of FIG. 5, allow the storing of companded A-channel and B-channel word pairs, for example, as shown in FIG. 8.

Since all the input samples of the current frame are processed before new input samples are acquired and the companded samples for the current frame are stored into the companded data RAMs after the last dibit relative to the previous frame is output, only one 32×28 RAM (100) and two 16×22 RAMs (106, 108) are required to store, respectively, the input samples and the companded samples. Accordingly, no extra memories are required to store input or processed data.

Further with respect to FIG. 7, a shifter (at 164 and 174, respectively) right shifts the 14-bit A-channel and B-channel samples (at 162 and 172, respectively) based on the corresponding scale factors ($R_A$ at 192, $R_B$ at 222). The shifter (164, 174) can right shift the input by a factor 4, 3, 2, 1, or 0. For instance, if the scale factor is 7, the input is right shifted by 4 bits. The sign bit is automatically shifted, so it is always the MSB of the 10 LSBs (at 198 and 228, respectively). Therefore the 4 MSBs can be discarded (at 196 and 226, respectively). The parity bit of each channel is computed by EX-ORing the 6 MSBs (at 200 and 230, respectively), the resulting bit (at 202 and 232, respectively) is then EX-ORed with the scale factor bit of the scale factors $R_A$ and $R_B$ (at 192 and 222, respectively) according to Equation 1. Modified parity bits P'i (at 206 and 236, respectively) are obtained by encoding the parity bits Pi with the scale factor words $R_A$ and $R_B$ in the following way:

$$P'i = Pi \oplus R_{2A} \quad \text{for} \quad i = 1, 7, 13, 19, 25, 31, 37, 43, 49 \quad \text{(Equation 1)}$$

$$P'i = Pi \oplus R_{1A} \quad \text{for} \quad i = 3, 9, 15, 21, 27, 33, 39, 45, 51$$

$$P'i = Pi \oplus R_{0A} \quad \text{for} \quad i = 5, 11, 17, 23, 29, 35, 41, 47, 53$$

$$P'i = Pi \oplus R_{2B} \quad \text{for} \quad i = 2, 8, 14, 20, 26, 32, 38, 44, 50$$

$$P'i = Pi \oplus R_{1B} \quad \text{for} \quad i = 4, 10, 16, 22, 28, 34, 40, 46, 52$$

$$P'i = Pi \oplus R_{0B} \quad \text{for} \quad i = 6, 12, 18, 24, 30, 36, 42, 48, 54$$

where i is the index of the 64 sample structure (indicated by reference numeral 19 of FIG. 2(I)), $R_{2A}$, $R_{1A}$, $R_{0A}$ and $R_{2B}$, $R_{1B}$, $R_{0B}$ are respectively the bits of $R_A$ and $R_B$, and $\oplus$ represents the EX-OR operation. Within a payload block, the parity bits 55 through 64 are not involved in conveying the range bits. In Equation 1, it is noted that the Pi and P'i with odd-numbered indexes are relative to channel A, while the Pi and P'i with even-numbered indexes are relative to channel B. Table 1, which is derived from Equation 1, links each RAM address with the corresponding scale factor bit. A modulo-3 counter (180) or a suitable look-up table (LUT), synchronized with the address counter, selects the scale factor bits which need to be EX-ORed with the current parity bits for the A-channel and B-channel data. The modified parity bits are then inserted before the MSBs of the companded data. The two 11-bit data are merged to form a 22-bit word on output 130 shown in FIG. 7. In this embodiment, the scrambling is performed directly on the samples before the interleaving process.

TABLE 1

| Input RAM address | Modulo 3 counter | Scale factor bit | Position before bit inter-leaving | Input RAM contents | | Position before bit inter-leaving | Scale factor bit |
|---|---|---|---|---|---|---|---|
| 0 | 2 | $R_{2A}$ | 1 | A1 | B1 | 2 | $R_{2B}$ |
| 1 | 1 | $R_{1A}$ | 3 | A2 | B2 | 4 | $R_{1B}$ |
| 2 | 0 | $R_{0A}$ | 5 | A3 | B3 | 6 | $R_{0B}$ |
| 3 | 2 | $R_{2A}$ | 7 | A4 | B4 | 8 | $R_{2B}$ |
| 4 | 1 | $R_{1A}$ | 9 | A5 | B5 | 10 | $R_{1B}$ |
| 5 | 0 | $R_{0A}$ | 11 | A6 | B6 | 12 | $R_{0B}$ |
| 6 | 2 | $R_{2A}$ | 13 | A7 | B7 | 14 | $R_{2B}$ |
| 7 | 1 | $R_{1A}$ | 15 | A8 | B8 | 16 | $R_{1B}$ |
| 8 | 0 | $R_{0A}$ | 17 | A9 | B9 | 18 | $R_{0B}$ |
| 9 | 2 | $R_{2A}$ | 19 | A10 | B10 | 20 | $R_{2B}$ |
| 10 | 1 | $R_{1A}$ | 21 | A11 | B11 | 22 | $R_{1B}$ |
| 11 | 0 | $R_{0A}$ | 23 | A12 | B12 | 24 | $R_{0B}$ |
| 12 | 2 | $R_{2A}$ | 25 | A13 | B13 | 26 | $R_{2B}$ |
| 13 | 1 | $R_{1A}$ | 27 | A14 | B14 | 28 | $R_{1B}$ |
| 14 | 0 | $R_{0A}$ | 29 | A15 | B15 | 30 | $R_{0B}$ |
| 15 | 2 | $R_{2A}$ | 31 | A16 | B16 | 32 | $R_{2B}$ |
| 16 | 1 | $R_{1A}$ | 33 | A17 | B17 | 34 | $R_{1B}$ |
| 17 | 0 | $R_{0A}$ | 35 | A18 | B18 | 36 | $R_{0B}$ |
| 18 | 2 | $R_{2A}$ | 37 | A19 | B19 | 38 | $R_{2B}$ |
| 19 | 1 | $R_{1A}$ | 39 | A20 | B20 | 40 | $R_{1B}$ |
| 20 | 0 | $R_{0A}$ | 41 | A21 | B21 | 42 | $R_{0B}$ |
| 21 | 2 | $R_{2A}$ | 43 | A22 | B22 | 44 | $R_{2B}$ |
| 22 | 1 | $R_{1A}$ | 45 | A23 | B23 | 46 | $R_{1B}$ |
| 23 | 0 | $R_{0A}$ | 47 | A24 | B24 | 48 | $R_{0B}$ |
| 24 | 2 | $R_{2A}$ | 49 | A25 | B25 | 50 | $R_{2B}$ |
| 25 | 1 | $R_{1A}$ | 51 | A26 | B26 | 52 | $R_{1B}$ |
| 26 | 0 | $R_{0A}$ | 53 | A27 | B27 | 54 | $R_{0B}$ |

In one embodiment, wherein N is selected to be 32 (FIG. 7), the pseudo-random Sequence generator or scrambler comprises a 32×22 look-up table (ROM 182) containing the 1-bit pre-computed pseudo-random numbers stored in such a way that they are output at the correct time with respect to the companded data before interleaving. Even though the repetition period of the pseudo-random sequence is 511, 22×32=704 values are stored to simplify the design. In this way, the 1-bit pre-computed pseudo-random numbers can be EX-OR'ed (via EX-OR gate 170) with the 22 bit companded samples produced by the processor 82. In one embodiment, it has been determined that only the companded data need to be scrambled as a result of an implementation of several pre-determined conditions. The pre-determined conditions include:

1) the FAW does not need to be scrambled per the requirements of the NICAM standard;
2) by definition in the NICAM standard, the 5-bit control information is output during the initial portion of the pseudo-random sequence which contains only zeros (0s); and
3) the value of the eleven (11) additional data bits can be set to an arbitrary value (e.g., 0), and then prescramble the additional data bits in advance.

Figure 9:
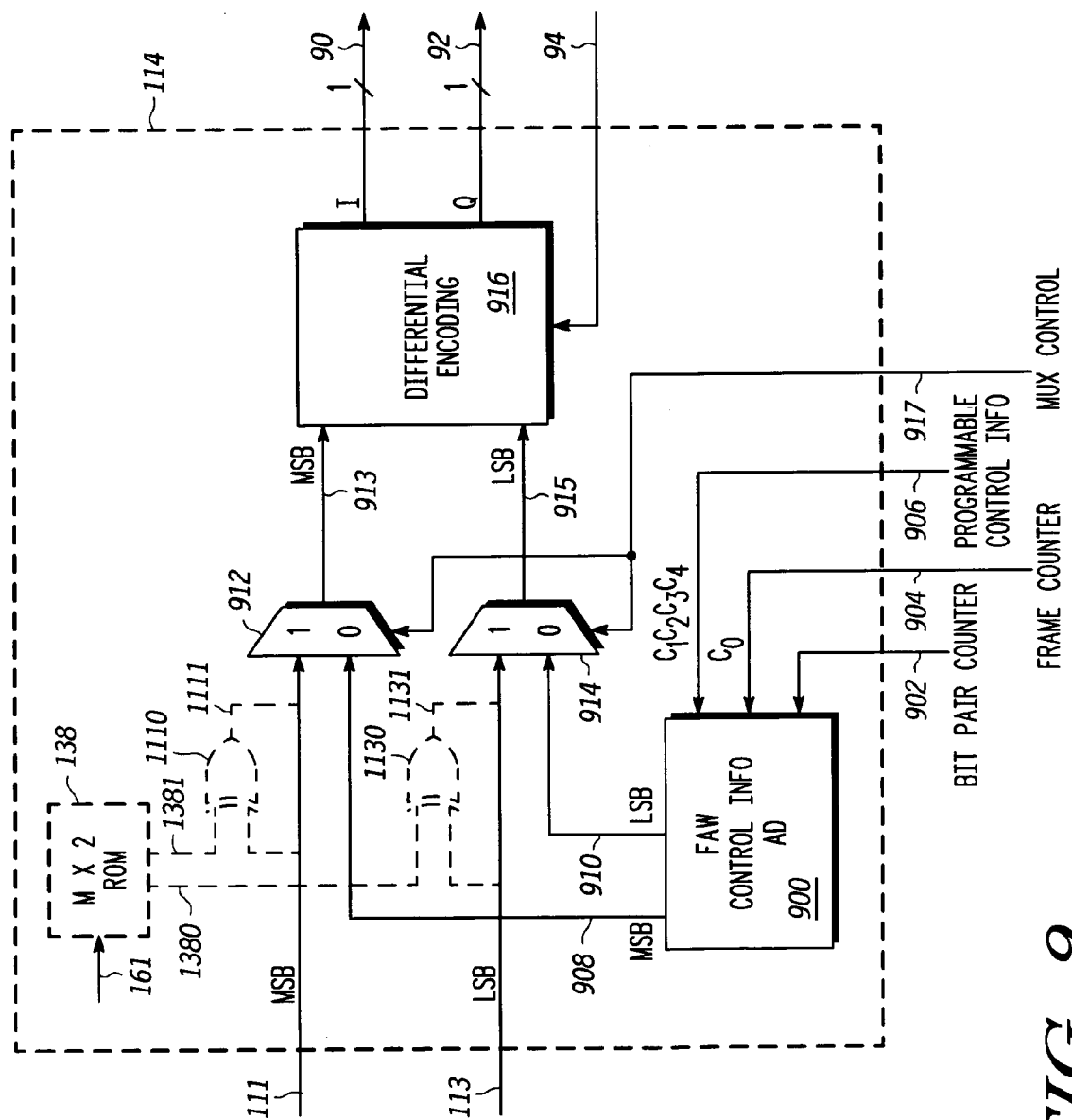
FIG. 9 is a schematic block diagram view of the bit stream generator block of FIG. 5 in greater detail according to one embodiment of the present disclosure.

In another embodiment, the seven hundred and four (704) pseudo-random numbers are stored into an M×2 look-up table, such as ROM 138, where M equals 352, and wherein the scrambling is performed in the bit stream generator 114 (FIGS. 5 and 9).

FIG. 8 illustrates an example of the memory mapping 250 for the acquisition and companding according to one embodiment of the present disclosure. Block 252 shows the memory mapping for the acquisition of A-channel and B-channel data. The 32 samples of each column of the matrix are indicated by reference numeral 260 and the 28 bits of each row of the matrix are indicated by reference numeral 262. Thirty-two 14-bit A-channel and B-channel data are stored as they are generated by the input section of FIG. 4. Block 254 represents the 24 bits of the frame alignment word (FAW), the control information (C), and the additional data (AD) from LSB to MSB. Block 256 is derived from FIG. 2(II), corresponding to that as is defined in the NICAM standard to describe the bit interleaving process. Block 256 shows the matrix structure used to perform the bit interleaving using data words instead of bits. The 44 bits (or 4 companded words) of each column of the matrix are indicated by reference numeral 264 and the 16 bits of each row of the matrix are indicated by reference numeral 266. First and second columns of the matrix 256 are indicated by reference numerals 268 and 270, respectively. The last column of the matrix 256 is indicated by reference numeral 272. More particularly, block 256 has been illustrated in FIG. 8 as comprising a 44×16 matrix structure written by columns (4 companded words at a time) and read by rows (one bit at a time). In the past, such a structure of block 256 would not be very cost effective because it would require either (i) a special RAM which can be written by columns and read by rows or (ii) an FPGA. However, the embodiments of the present disclosure overcome such problems in the art.

According to one embodiment of the present disclosure, the bit interleaving process includes a combination of memory mapping (blocks 106 and 108, FIG. 8) and bit extraction (blocks 110 and 112, FIG. 5). In other words, the NICAM processor 82 performs the bit interleaving process in two steps.

First, the companded samples are stored into two 16×22 RAMs (106 and 108) organized as shown in FIG. 8, indicated collectively by reference numeral 258. As illustrated, the 16 bits of each column of the RAMs (106 and 108) are indicated by reference numeral 274 and the 22 bits of each row (containing an A-channel and a B-channel companded sample) of the RAMs 106 and 108 are indicated by reference numerals 276 and 278, respectively.

Second, RAM locations are read several times, extracting just one bit from RAM 1 (106) and one from RAM 0 (108) at each RAM access. This allows to simplify the bit interleaving process and to directly generate dibits (or bit pairs). In particular, the 11 MSBs of RAM 1 and RAM 0 for addresses 0 through 7 correspond to the first row of the matrix 256 shown in FIG. 8 and the 11 LSBs of RAM 1 and RAM 0 for addresses 0 through 7 correspond to the second row of matrix 256. The 11 MSBs and the 11 LSBs of RAM 1 and RAM 0 for addresses 8 through 15 of RAM 1 and RAM 0 contain the samples of the third and fourth row of matrix 256, respectively. In other words, RAM 1 and RAM 0 respectively contain the MSB and LSB of each dibit (e.g., dibit (A$1_j$, A$3_j$), dibit (A$5_j$, A$7_j$), ... dibit (A$29_j$, A$31_j$); dibit (B$1_j$, B$3_j$), dibit (B$5_j$, B$7_j$), ... dibit (B$29_j$, B$31_j$); dibit (A$2_j$, A$4_j$), dibit (A$6_j$, A$8_j$), ... dibit (A$30_j$, A$32_j$); dibit (B$2_j$, B$4_j$), dibit (B$6_j$, B$8_j$), ... dibit (B$30_j$, B$32_j$), where j is the bit index and its range is 0 through 10).

The address counter of RAM 1 (106) and RAM 0 (108) is incremented every time a processor output strobe 94 is received from the front-end output section 84. The strobe 94 is generated approximately at the symbol rate. Locations at addresses 0 through 7 of RAM 1 (106) and RAM 0 (108) are read twenty-two times. The full words are read, but only two bits are actually used (i.e., extracted) each time. The first time, all LSBs of words A are read (corresponding to bits 25, 69, 113, 157 .... 685 of FIG. 2(II)), the second time, all the bits next to the LSBs of words A are read (corresponding to bits 26, 70, 114, 158 .... 686) and so on. After eleven times, all the bits of words A are read. The process is repeated another eleven times to read all the bits of words B. The same process is then applied to addresses 8 through 15. The dibits extracted from RAM 1 (106) and RAM 0 (108) are available on outputs 111 and 113 of bit extractors 110 and 112 of FIG. 5, respectively.

FIG. 9 is a schematic block diagram view of the bit stream generator 114 of FIG. 5 in greater detail according to one embodiment of the present disclosure. The bit stream generator 114 performs the task of processing the 8-bit FAW, 5-bit control info and 11-bit additional data for being combined with the payload. The resultant output bit stream is equivalent to the one shown in FIG. 2 (II), wherein the bits are grouped in bit pairs, the odd-numbered bits are MSBs and the even-numbered bits are LSBs. Furthermore, in one embodiment, the bit stream generator 114 also performs the differential encoding, thereby producing in-phase and quadrature data which are transmitted to the output section 84 of FIG. 4. In another embodiment, the bit stream generator 114 also performs the scrambling of the interleaved companded data bits, via ROM 138 and EX-OR gates 1110 and 1113, as discussed further herein.

As illustrated in FIG. 9, bit stream generator 114 includes two multiplexers 912 and 914, a preface generator 900, and a differential encoder 916. Preface generator 900 outputs one of the FAW, control information, and additional data, in bit pairs, in response to suitable control signals. In particular, responsive to a bit pair counter input on signal line 902, frame counter input on signal line 904, and a programmable control info input on signal line 906, preface generator 900 produces the FAW, control information, and additional data, grouped in bit pairs, on the MSB and LSB outputs 908 and 910, respectively. Responsive to a MUX control signal on signal line 917, multiplexer 912 multiplexes one of the inputs 111 and 908 on MUX output 913 and multiplexer 914 multiplexes one of the inputs 113 and 910 on MUX output 915.

For bit pairs 0 through 11, the multiplexer outputs are coupled to the outputs of preface generator 900, while for bit pairs 12 through 363, they are coupled to signals 111 and 113. In this manner, the FAW, control information, and additional data, which are produced in bit pairs by preface generator 900, are inserted at the beginning of the output bit stream before the payload. Recall that the payload comprises the outputs of bit extraction blocks 110 and 112 of FIG. 5 on signal lines 111 and 113, respectively. Furthermore, responsive to the processor strobe 94 and to data on inputs 913 and 915, the differential encoder 916 produces differentially encoded in-phase and quadrature data on outputs I (90) and Q (92), respectively. The outputs I and Q (90 and 92) are transmitted to the output section 84 of FIG. 4, wherein the output bit stream is sampled at 364 kHz. The various control signals (bit pair counter, frame counter, programmable control information, MUX control, and processor strobe) are provided by suitable circuitry or other means (not shown), for implementing the same in connection with the NICAM encoder processing according to the embodiments of the present disclosure.

Further as mentioned above, in another embodiment, the bit stream generator can also include a scrambler in the form of an (M×2) ROM (or look-up table) 138 and EX-OR gates 1110 and 1130. ROM 138 receives address information via address input 161. The ROM (look-up table) and EX-OR gates are configured to perform scrambling of input data of block 114, as appropriate. In particular, ROM 138 is coupled to first inputs of EX-OR gates 1110 and 1130 via signal lines 1380 and 1381, respectively. The second inputs of EX-OR gates 1110 and 1130 are coupled to MSB line 111 and LSB line 113, respectively. In this embodiment, the lines 111 and 113 would not directly couple to the first inputs of MUXes 912 and 914, respectively. The outputs of gates 1110 and 1130 are coupled to the first inputs of MUXes 912 and 914, respectively. Further in this embodiment, the value of M is 352.

In yet another embodiment, the outputs of bit extraction circuit blocks 110 and 112 are merged into a single bit stream, for example, by a parallel-to-serial converter (not shown) or bits are extracted one at a time from the companded data RAMs 106 and 108. The preface data (FAW, control information and additional data) is produced by a modified preface generator, similar to preface generator 900, but with a single bit output. The preface data (FAW, control information, and additional data) are multiplexed with the output of the parallel-to-serial converter, thus producing the bit stream illustrated in FIG. 2(II). In such an embodiment, the bit stream sampled at approximately 728 kHz is sent to the output section 84 where it is converted into bit pairs by a parallel-to-serial converter (not shown). The bit pairs are then differentially encoded prior to performing a QPSK modulation.

In one embodiment, the NICAM processor 82 produces 364 in-phase and 364 quadrature data in every 1 ms frame, provided on signal lines 90 and 92, respectively.

In one embodiment, the system clock frequency is 24 MHz which is produced directly by a crystal oscillator and all other clocks are derived from this system clock 68 with integer dividers. Accordingly, no PLL is needed. A single-chip implementation of the NICAM encoder is shown in FIG. 4. In an alternate embodiment, the front-end sections (80,84) and NICAM processor 82 can also be embedded in an audio/video integrated circuit chip.

As discussed herein, the embodiments of the present disclosure provide for a very efficient implementation of the NICAM algorithm requiring a limited amount of memory and circuitry, as well as, reduced overall costs of system implementation. In addition, the embodiments further solve problems in the art by enabling the equipping of VCRs, DVD players, decoders, set-top boxes and other audio/video applications with NICAM encoders according to the present disclosure. In fact, since NICAM encoders in conjunction with RF modulators can provide composite video and high-quality stereo sound through a single RF connector instead of the 21-pin SCART connector or the three audio/video connectors (video, left audio and right audio), the NICAM encoders can be employed in DVD players, stereo VCRs, set-top boxes, gaming stations and stand-alone units, thus simplifying the typical home entertainment wiring architecture and also allowing the same to connect to remote television sets. By using equipment with built-in NICAM encoders according to the embodiments of the present disclosure, a number of audio/video applications can be connected via coaxial cable to a set-top box and receive stereo audio. Furthermore, the typical home entertainment wiring can be greatly simplified.

The embodiments of the present disclosure enable encoders to be produced at a low price. Accordingly, this enables NICAM encoders to become widely used in consumer electronics applications. Furthermore, the embodiments of the present disclosure address this issue by incorporating a NICAM processor having a limited amount of circuitry and memory that enables a much more cost effective implementation of NICAM encoders than previously known.

According to one embodiment, a NICAM processing method includes receiving and temporarily storing a current frame of A-channel and B-channel input data into a first memory at a first clock rate. Companded A-channel and B-channel data of a previous frame are read from a second memory at a second clock rate and in a manner for interleaving the previous frame companded A-channel and B-channel data into the NICAM standard required interleaved format, wherein the companded A-channel and B-channel data of the previous frame was temporarily stored during a previous frame into the second memory in a format other than an interleaved format according to NICAM standard requirements. The A-channel and B-channel input data of the current frame is companded and stored into the second memory and in the format other than the interleaved format, wherein the companding and storing are performed at a third clock rate during an interval within the current frame that occurs subsequent to both the storing into the first memory and the reading from the second memory.

The NICAM processing also includes generating a first portion of an output bit stream, the first portion including a frame alignment word (FAW), control information and additional data; multiplexing the first portion with a payload portion of the output bit stream as a function of the interleaved companded A-channel and B-channel data of the previous frame and outputting the output bit stream, wherein the output bit stream comprises the first portion and the payload portion. In one embodiment, when dibits are generated, the method can further include differentially encoding the output bit stream prior to outputting. In addition, the first portion of the output bit stream can comprise dibits of the (a) frame alignment word (FAW), (b) control information and (c) additional data, and the payload portion of the output bit stream can comprise dibits of the interleaved companded A-channel and B-channel data of the previous frame as interleaved through reading from the second memory. In addition, the first clock rate, the second clock rate, and the third clock rate are different from one another. Furthermore, the output bit stream may comprise one of single bits or dibits, corresponding to a single bit stream at 728 kHz or a dibit bit stream at 364 kHz, respectively.

In yet another embodiment, the format other than the interleaved format according to the NICAM standards comprises a dual word pre-interleaved format. Furthermore, a dual word of the dual word pre-interleaved format comprises 22-bits of a companded A-channel word and a companded B-channel word pair.

In another embodiment of the NICAM processing method, reading the previous frame companded A-channel and B-channel data from the second memory comprises: (i) reading a first word, corresponding to a MSB word, and a second word, corresponding to a LSB word, of a companded A-channel word pair or a companded B-channel word pair, (ii) extracting a bit from the first word and a bit from the second word to form a dibit, and (iii) repeating the reading and extracting until all dibits contained within the second memory have been read and extracted. All of the read and extracted dibits together form a bit stream of 704 bits of interleaved and companded A-channel and B-channel data, in conformance with NICAM standard requirements.

In another embodiment, the second memory comprises first and second companded data RAMs, and wherein the companding and storing further comprises storing the companded data into first and second companded data RAMs in a prescribed order. In addition, reading further comprises reading from the first and second companded data RAMs using first and second bit extractors, respectively, for extracting two bits per access of the first and second companded data RAMs. The two extracted bits per access correspond to a dibit. Furthermore, the interval in which the companding and storing is performed corresponds to an interval subsequent to reading a last dibit from the second memory and prior to the beginning of a subsequent frame.

In still other embodiments, the inputting and storing of the A-channel and B-channel input data of the current frame in the first memory is performed concurrently with the reading of the previous frame companded A-channel and B-channel data from the second memory. The first clock rate comprises 32 kHz, the second clock rate comprises approximately 364 kHz (for a dibit implementation) or 728 kHz (for a single bit implementation), and the third clock rate comprises approximately 24 MHz. The NICAM processing method can be performed via a single integrated circuit chip implementation. The first memory comprises a (32×28) RAM, and the second memory comprises first and second (16×22) RAMs. In the latter embodiment, the first and second (16×22) RAMs store companded A-channel and B-channel word pairs in a pre-interleaved manner and wherein the interleaving circuit reading means reads the companded A-channel and B-channel word pairs from the first and second (16×22) RAMS in an interleaved manner.

In a further embodiment, the companded A-channel and B-channel data of the current frame comprise word pairs of 22-bits each and the NICAM processing method further comprises scrambling each 22-bit companded A-channel and B-channel data word pair, in association with said companding and storing, wherein scrambling comprises use of an (N×22) ROM and an EX-OR gate block, further wherein a 22-bit output of the (N×22) ROM is coupled to first inputs of the EX-OR gate block and the 22-bit companded A-channel and B-channel data word pairs are coupled, one word pair at a time, to second inputs of the EX-OR gate block, where N is equal to 32. In the latter embodiment, the (N×22) ROM contains a look-up table, and wherein scrambling is re-initialized at the beginning of every frame.

In yet a still further embodiment, the NICAM processing method further comprises scrambling the interleaved companded A-channel and B-channel data of the previous frame, wherein scrambling comprises use of an (M×2) ROM and a dual EX-OR gate, further wherein a 2-bit output of the (M×2) ROM is coupled to first inputs of the dual EX-OR gate and a 2-bit MSB and LSB portion of interleaved companded A-channel and B-channel data is coupled, 2-bits at a time, to second inputs of the dual EX-OR gate, where M is equal to 352. In this latter embodiment, the (M×2) ROM contains a look-up table, and wherein scrambling is re-initialized at the beginning of every frame.

In still another embodiment, a NICAM processing method comprises receiving A-channel and B-channel input data and temporarily storing a current frame of A-channel and B-channel input data into a first memory at a first clock rate; temporarily storing companded A-channel and B-channel data of a previous frame into a second memory in a format other than an interleaved format according to NICAM standard requirements; reading the previous frame companded A-channel and B-channel data from the second memory at a second clock rate and in a manner for interleaving the previous frame companded A-channel and B-channel data into the NICAM standard required interleaved format; and companding the A-channel and B-channel input data of the current frame and storing the companded A-channel and B-channel input data of the current frame into the second memory at a third clock rate and in the format other than the interleaved format, wherein the companding and storing are performed during an interval within the current frame, subsequent to the storing into the first memory and the reading from the second memory, wherein the first clock rate, the second clock rate, and the third clock rate are different from one another.

In the foregoing specification, the disclosure has been described with reference to the various embodiments. However, one of ordinary skill in the art appreciates that various modifications and changes can be made without departing from the scope of the present embodiments as set forth in the claims below. Accordingly, the specification and figures are to be regarded in an illustrative rather than a restrictive sense, and all such modifications are intended to be included within the scope of the present embodiments. For example, one embodiment of the present disclosure includes stereophonic audio encoders used for audio/video consumer electronics.

The embodiments of the present disclosure further include a NICAM encoder with a NICAM processor that comprises a single-chip NICAM encoder. The embodiments of the present disclosure still further comprise an integrated circuit that includes the NICAM encoder with a NICAM processor as discussed herein. Yet still further, in addition to the embodiments disclosed herein with respect to the first and second memories, other sizes, types, and quantities of memories could be used, with appropriate modifications and/or changes, according to the requirements of a particular NICAM processing and/or NICAM processor implementation.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A NICAM processing method comprising:
receiving and temporarily storing a current frame of A-channel and B-channel input data into a first memory at a first clock rate;
reading companded A-channel and B-channel data of a previous frame from a second memory at a second clock rate and in a manner for interleaving the previous frame companded A-channel and B-channel data into the NICAM standard required interleaved format, the companded A-channel and B-channel data of the previous frame having been temporarily stored during a previous frame into the second memory in a format other than an interleaved format according to NICAM standard requirements, wherein the second memory includes a first RAM and a second RAM, and wherein the format other than the interleaved format according to the NICAM standards comprises a dual word pre-interleaved format, and wherein each dual word of the dual word pre-interleaved format comprises 22-bits of a companded A-channel word and a companded B-channel word pair, and wherein each dual word is stored in one of the first RAM or the second RAM, and wherein the reading the companded A-channel and B-channel data of the previous frame from the second memory comprises:
(i) reading a first dual word from an address of said first RAM and a second dual word from an address of said second RAM, wherein said address of said first RAM and said address of said second RAM have a same address value,
(ii) extracting a bit from a first word of the first dual word and a bit from a second word of the second dual word to form a dibit, wherein the bit from the first word is a MSB of the dibit and the bit from the second word is the LSB of the dibit, and
(iii) repeating the reading and extracting until all dibits contained within the second memory have been read and extracted, wherein the read and extracted dibits together form a bit stream of 704 bits of interleaved and companded A-channel and B-channel data according to NICAM standard requirements; and companding the A-channel and B-channel input data of the current frame and storing the companded A-channel and B-channel input data of the current frame into the second memory in the format other than the interleaved format, wherein the companding and storing are performed at a third clock rate during an interval within the current frame that occurs subsequent to both the storing into the first memory and the reading from the second memory.

2. The NICAM processing method of claim 1, further comprising:
generating a first portion of an output bit stream, the first portion including a frame alignment word (FAW), control information and additional data; multiplexing the first portion with a payload portion of the output bit stream as a function of the interleaved companded A-channel and B-channel data of the previous frame, wherein the output bit stream comprises the first portion and the payload portion, and
outputting the output bit stream.

3. The NICAM processing method of claim 2, further comprising:
differentially encoding the output bit stream prior to outputting.

4. The NICAM processing method of claim 2, wherein the first portion of the output bit stream comprises dibits of the (a) frame alignment word (FAW), (b) control information and (c) additional data, and wherein the payload portion of the output bit stream comprises dibits of the interleaved companded A-channel and B-channel data of the previous frame as interleaved through reading from the second memory.

5. The NICAM processing method of claim 1, wherein the first clock rate, the second clock rate, and the third clock rate are different from one another.

6. The NICAM processing method of claim 1, wherein the second memory comprises first and second companded data RAMs, and wherein said companding and storing further comprises storing the companded data into first and second companded data RAMs in a prescribed order, and wherein said reading further comprises reading from the first and second companded data RAMs using first and second bit extractors, respectively, for extracting two bits per access of the first and second companded data RAMs, wherein the two extracted bits per access correspond to a dibit.

7. The NICAM processing method of claim 6, wherein the interval is subsequent to reading a last dibit from the second memory and prior to the beginning of a subsequent frame.

8. The NICAM processing method of claim 1, wherein said inputting and storing of the A-channel and B-channel input data of the current frame in the first memory is performed concurrently with said reading of the previous frame companded A-channel and B-channel data from the second memory.

9. The NICAM processing method of claim 2, wherein the first clock rate comprises 32 kHz, the second clock rate comprises one of approximately 364 kHz or 728 kHz, and the third clock rate comprises approximately 24 MHz, and wherein the interleaved companded A-channel and B-channel data of the previous frame comprises the payload portion of the output bit stream, further wherein the output bit stream comprises one of (i) single bits or (ii) dibits, corresponding to a single bit stream at 728 kHz or a dibit bit stream at 364 kHz, respectively.

10. The NICAM processing method of claim 1, wherein said NICAM processing is performed via a single integrated circuit chip implementation.

11. The NICAM processing method of claim 1, wherein the first memory comprises a (32×28) RAM, and wherein the second memory comprises first and second (16×22) RAMs.

12. The NICAM processing method of claim 11, further wherein the first and second (16×22) RAMs store companded A-channel and B-channel word pairs in a pre-interleaved manner and wherein said reading from the second memory further comprises reading the companded A-channel and B-channel word pairs from the first and second (16×22) RAMS in an interleaved manner.

13. The NICAM processing method of claim 1, wherein the companded A-channel and B-channel data of the current frame comprise word pairs of 22-bits each, said NICAM processing method further comprising:
scrambling each 22-bit companded A-channel and B-channel data word pair, in association with said companding and storing, wherein scrambling comprises use of an (N×22) ROM and an EX-OR gate block, further wherein a 22-bit output of the (N×22) ROM is coupled to first inputs of the EX-OR gate block and the 22-bit companded A-channel and B-channel data word pairs are coupled, one word pair at a time, to second inputs of the EX-OR gate block, where N is equal to 32.

14. The NICAM processing method of claim 13, further wherein the (N×22) ROM contains a look-up table, and wherein scrambling is re-initialized at the beginning of every frame.

15. The NICAM processing method of claim 1, further comprising:
scrambling the interleaved companded A-channel and B-channel data of the previous frame, wherein scrambling comprises use of an (M×2) ROM and a dual EX-OR gate, further wherein a 2-bit output of the (M×2) ROM is coupled to first inputs of the dual EX-OR gate and a 2-bit MSB and LSB portion of interleaved companded A-channel and B-channel data is coupled, 2-bits at a time, to second inputs of the dual EX-OR gate, where M is equal to 352.

16. The NICAM processing method of claim 15, further wherein the (M×2) ROM contains a look-up table, and wherein scrambling is re-initialized at the beginning of every frame.

17. The NICAM processing method of claim 1, wherein the repeating the reading and extracting comprises:
reading and extracting all dibits contained within a first portion of each of the first RAM and the second RAM, and
after the reading and extracting all dibits from the first portion of each of the first RAM and the second RAM, reading and extracting all dibits contained within a second portion of each of the first RAM and the second RAM.

18. The NICAM processing method of claim 17, wherein each of the first RAM and the second RAM is a (16×22) RAM, and wherein the first portion of each of the first RAM and the second RAM comprises rows corresponding to addresses 0 through 7 and the second portion of each of the first RAM and the second RAM comprises rows corresponding to addresses 8 through 15.

19. A NICAM processing method comprising:
receiving A-channel and B-channel input data and temporarily storing a current frame of A-channel and B-channel input data into a first memory at a first clock rate;
temporarily storing companded A-channel and B-channel data of a previous frame into a second memory in a format other than an interleaved format according to NICAM standard requirements, wherein the second memory includes a first RAM and a second RAM, and wherein the format other than the interleaved format according to the NICAM standards comprises a dual word pre-interleaved format, and wherein each dual word of the dual word pre-interleaved format comprises 22-bits of a companded A-channel word and a companded B-channel word pair, and wherein each dual word is stored in one of the first RAM or the second RAM;

reading the previous frame companded A-channel and B-channel data from the second memory at a second clock rate and in a manner for interleaving the previous frame companded A-channel and B-channel data into the NICAM standard required interleaved format, wherein the reading the previous frame companded A-channel and B-channel data from the second memory comprises:

(i) reading a first dual word from an address of said first RAM and a second dual word from an address of said second RAM, wherein said address of said first RAM and said address of said second RAM have a same address value, (ii) extracting a bit from a first word of the first dual word and a bit from a second word of the second dual word to form a dibit, wherein the bit from the first word is a MSB of the dibit and the bit from the second word is the LSB of the dibit, and (iii) repeating the reading and extracting until all dibits contained within the second memory have been read and extracted, wherein the read and extracted dibits together form a bit stream of 704 bits of interleaved and companded A-channel and B-channel data according to NICAM standard requirements; and companding the A-channel and B-channel input data of the current frame and storing the companded A-channel and B-channel input data of the current frame into the second memory at a third clock rate and in the format other than the interleaved format, wherein said companding and storing are performed during an interval within the current frame, subsequent to the storing into the first memory and the reading from the second memory, wherein the first clock rate, the second clock rate, and the third clock rate are different from one another.

* * * * *